United States Patent
Jin

(10) Patent No.: US 11,216,620 B1
(45) Date of Patent: Jan. 4, 2022

(54) METHODS AND APPARATUSES FOR TRAINING SERVICE MODEL AND DETERMINING TEXT CLASSIFICATION CATEGORY

(71) Applicant: Alipay (Hangzhou) Information Technology Co., Ltd., Zhejiang (CN)

(72) Inventor: Mingmin Jin, Zhejiang (CN)

(73) Assignee: ALIPAY (HANGZHOU) INFORMATION TECHNOLOGY CO., LTD., Zhejiang (CN)

(*) Notice: Subject to any disclaimer, the term of this patent is extended or adjusted under 35 U.S.C. 154(b) by 0 days.

(21) Appl. No.: 17/356,112

(22) Filed: Jun. 23, 2021

(30) Foreign Application Priority Data

Jul. 17, 2020 (CN) .......................... 202010691951.3

(51) Int. Cl.
*G06F 40/30* (2020.01)
*G06F 16/28* (2019.01)
(Continued)

(52) U.S. Cl.
CPC ............ *G06F 40/30* (2020.01); *G06F 16/285* (2019.01); *G06N 3/08* (2013.01); *G06F 40/205* (2020.01)

(58) Field of Classification Search
USPC ................................................ 704/7–10, 257
See application file for complete search history.

(56) References Cited

U.S. PATENT DOCUMENTS

2017/0308790 A1* 10/2017 Nogueira dos Santos ................. G06N 3/0454
2018/0225553 A1* 8/2018 Ha ....................... G06Q 10/067
(Continued)

FOREIGN PATENT DOCUMENTS

| CN | 110929870 A | 3/2020 |
|---|---|---|
| CN | 111209398 A | 5/2020 |
| CN | 111274405 A | 6/2020 |
| CN | 111738014 A | 10/2020 |

OTHER PUBLICATIONS

Yao et al., "Graph Convolutional Networks for Text Classification," Nov. 13, 2018, retrieved from https://arxiv.org/abs/1809.05679, 9 pages.

(Continued)

*Primary Examiner* — Leonard Saint Cyr
(74) *Attorney, Agent, or Firm* — Seed IP Law Group LLP

(57) ABSTRACT

Implementations of the present specification provide a method and an apparatus for training a service model, and a method and an apparatus for determining a text classification category. During specific implementation, on the one hand, text is processed by using an encoding network to obtain a corresponding semantic vector; on the other hand, a relationship network is established for classification categories based on a hierarchical relationship, and the relationship network is processed by using a graph convolutional network, to fuse information of nodes to obtain category expression vectors. Then, the semantic vector of the text is fused with the category expression vectors to determine a prediction result of a classification category. In a phase of training a service model, the prediction result can be compared with a sample label to determine a loss and adjust model parameters. In a phase of determining a text classification category by using a trained service model, the corresponding classification category can be determined based on the prediction result. This implementation can improve text classification accuracy.

22 Claims, 5 Drawing Sheets

(51) Int. Cl.
 *G06N 3/08* (2006.01)
 *G06F 40/205* (2020.01)

(56) References Cited

U.S. PATENT DOCUMENTS

2018/0357531 A1\* 12/2018 Giridhari .............. G06N 20/00
2019/0087490 A1\* 3/2019 Liu ....................... G06N 3/08
2020/0293720 A1\* 9/2020 Tu ......................... G06N 3/08

OTHER PUBLICATIONS

Zhou et al., "Graph Neural Networks: A Review of Methods and Applications," Apr. 9, 2021, retrieved from https://arxiv.org/abs/1812.08434, 25 pages.
Wu et al., "A Comprehensive Survey on Graph Neural Networks," URL=https://www.jiqizhixin.com/articles/2019-01-07-8 <https://protect-us.mimecast.com/s/rYJJCJ67LLfqKXZ9UV-KJ-?domain=jiqizhixin.com>, published 2019, downloaded Jul. 14, 2021, 10 pages.
"Analysis of Graph Convolutional Neural Network," URL=https://www.pianshen.com/article/80491417552/ <https://protect-us.mimecast.com/s/K9vbCL95NNSRQvKBfPntG-?domain=pianshen.com>, published 2019, downloaded Jul. 14, 2021, 13 pages.
Liu et al. "Tensor Graph Convolutional Networks for Text Classification," URL=https://posts.careerengine.us/p/5e25d108127ae52cc65ac39e <https://protect-us.mimecast.com/s/EJ4RCKr5MMS24JO7SvuOVB?domain=posts.careerengine.us>, Published 2020, downloaded Jul. 14, 2021, 11 pages.

\* cited by examiner

METHODS AND APPARATUSES FOR TRAINING SERVICE MODEL AND DETERMINING TEXT CLASSIFICATION CATEGORY

BACKGROUND

Technical Field

One or more implementations of the present specification relate to the field of computer technologies, and in particular, to methods and apparatuses for training a service model used to predict a text classification category and determining a text classification category by using a trained service model.

Description of the Related Art

With the development of computer technologies, machine learning is increasingly widely applied. Artificial Intelligence (AI) is a type of new technological science for researching and developing theories, methods, technologies, and application systems for simulating, extending, and expanding human intelligence. AI can fully utilize machine learning to bring great convenience to human life. In the text processing field, applications of artificial intelligence can include, for example, personalized information push, sensitive word recognition, sentiment analysis, copywriting prediction, and text category prediction.

The text category prediction can be predicting a classification category for text. The classification category described in the present specification can be referred to as an index, a query, etc. In an actual service scenario, a text classification category usually also has hierarchical information. For example, text "The stock having risen the most in price today" may correspond to a classification category "finance|finance management|stocks," including three levels from high to low: "finance," "finance management," and "stocks," or text "018 new products on sale! Men's and women's air cushion shoes!" corresponds to a classification category "e-commerce retail|clothes, shoes, and bags|sports shoes," including three levels from high to low: "e-commerce retail," "clothes, shoes, and bags," and "sports shoes." It can be seen that a hierarchical relationship directly included in the classification category contains rich hierarchical information. If the hierarchical information can be fully utilized, accuracy of predicting a text classification category by using artificial intelligence may be improved.

BRIEF SUMMARY

One or more implementations of the present specification describe a method and an apparatus for training a service model used to predict a text classification category, and a method and an apparatus for predicting a text classification category by using a trained service model.

According to a first aspect, a method for training a service model is provided. The service model includes an encoding network, a fusion layer, and a fully connected layer and is used to determine a text classification category. The method includes: obtaining a first text from a training sample set, the first text corresponding to a text label, and the text label being determined from multiple candidate categories; processing the first text by using the encoding network, to obtain a first semantic vector; processing a category hierarchical relationship network by using a graph convolutional network, to obtain category expression vectors respectively corresponding to candidate categories, where the category hierarchical relationship network includes nodes having a one-to-one correspondence with the candidate categories, candidate categories having a direct superior-inferior relationship are connected by a connection edge, each node corresponds to a respective node expression vector having a corresponding category feature vector as its initial value, the graph convolutional network is used to perform node expression vector aggregation of neighboring nodes for individual nodes to update corresponding node expression vectors, and the category expression vectors are node expression vectors corresponding to the nodes obtained through updating using the last layer of the graph convolutional network; fusing the category expression vectors based on the first semantic vector by using the fusion layer, to obtain a first fused vector for the first text; obtaining a first prediction result for a classification category of the first text based on the first fused vector and the first semantic vector by using the fully connected layer; and adjusting model parameters in the encoding network, the graph convolutional network, the fusion layer, and the fully connected layer with an objective of consistency between the first prediction result and the text label, to train the service model.

According to an implementation, the first text corresponds to candidate categories of multiple levels, and the text label is a candidate category of the lowest level.

According to an implementation, the number of dimensions of the first semantic vector and the number of dimensions of the category expression vector are both s, and the fusing the category expression vectors based on the first semantic vector by using the fusion layer, to obtain the first fused vector for the first text includes: comparing the first semantic vector with the category expression vectors to determine first degrees of similarity between the category expression vectors and the first semantic vector; and performing weighted summation on the category expression vectors by using the first degrees of similarity, to obtain the first fused vector, weights of the category expression vectors being positively correlated with the corresponding first degrees of similarity.

According to an implementation, the number of the candidate categories is n, the number of dimensions of the first semantic vector and the number of dimensions of the category expression vector are both s, and the fusing the category expression vectors based on the first semantic vector by using the fusion layer, to obtain the first fused vector for the first text includes: obtaining (a) an s-dimensional row vector corresponding to the first semantic vector and (b) an s-row and n-column category vector matrix formed by sequentially arranging the n category expression vectors; determining an n-dimensional intermediate vector based on a product of the s-dimensional row vector and the s-row and n-column category vector matrix; and performing weighted averaging on the category expression vectors by using respective elements in the n-dimensional intermediate vector as weighting weights of the corresponding candidate categories, to obtain the first fused vector.

According to an implementation, the obtaining the first prediction result for the classification category of the first text based on the first fused vector and the first semantic vector by using the fully connected layer includes: splicing the first fused vector with the first semantic vector to obtain a first spliced vector; and processing the first spliced vector by using the fully connected layer, to obtain the first prediction result.

According to an implementation, the adjusting the model parameters in the encoding network, the graph convolutional network, the fusion layer, and the fully connected layer with the objective of consistency between the first prediction result and the text label, to train the service model includes: determining a loss of the first prediction result relative to the text label by using a cross entropy method; and adjusting the model parameters in the encoding network, the graph convolutional network, the fusion layer, and the fully connected layer in a reduction direction of the loss.

According to an implementation, the method further includes: when initial values of the category feature vectors are random values, adjusting the category feature vectors in the category hierarchical relationship network with the objective of consistency between the first prediction result and the text label.

According to a second aspect, a method for determining a text classification category is provided. The method is implemented by using a service model including an encoding network, a fusion layer, and a fully connected layer. The method for determining a text classification category includes: obtaining a second text for classification category determination; processing the second text by using a pre-trained encoding network, to obtain a second semantic vector corresponding to the second text; obtaining category expression vectors respectively corresponding to candidate categories and obtained by processing a category hierarchical relationship network by using a pre-trained graph convolutional network, where the category hierarchical relationship network includes nodes having a one-to-one correspondence with the candidate categories, candidate categories having a direct superior-inferior relationship are connected by a connection edge, each node corresponds to a respective node expression vector having a corresponding category feature vector as its initial value, the graph convolutional network is used to perform node expression vector aggregation of neighboring nodes for individual nodes to update corresponding node expression vectors, and the category expression vectors are node expression vectors corresponding to the nodes obtained through updating using the last layer of the graph convolutional network; fusing the category expression vectors based on the second semantic vector by using the fusion layer, to obtain a second fused vector for the second text; obtaining a second prediction result for describing a classification category of the second text based on the second fused vector and the second semantic vector by using the fully connected layer; and determining the classification category of the second text based on the second prediction result.

According to an implementation, the number of dimensions of the second semantic vector and the number of dimensions of the category expression vector are both s, and the fusing the category expression vectors based on the second semantic vector by using the fusion layer, to obtain the second fused vector for the second text includes: comparing the second semantic vector with the category expression vectors to determine second degrees of similarity between the category expression vectors and the second semantic vector; and performing weighted summation on the category expression vectors by using the second degrees of similarity, to obtain the second fused vector, weights of the category expression vectors being positively correlated with the corresponding second degrees of similarity.

According to an implementation, the number of the candidate vectors is n, the number of dimensions of the second semantic vector and the number of dimensions of the category expression vector are both s, and the fusing the category expression vectors based on the second semantic vector by using the fusion layer, to obtain the second fused vector for the second text includes: obtaining (a) an s-dimensional row vector corresponding to the second semantic vector and (b) an s-row and n-column category vector matrix formed by sequentially arranging the n category expression vectors; determining an n-dimensional intermediate vector based on a product of the s-dimensional row vector corresponding to the second semantic vector and the s-row and n-column category vector matrix; and performing weighted averaging on the category expression vectors by using respective elements in the n-dimensional intermediate vector as weighting weights of the corresponding candidate categories, to obtain the second fused vector.

According to an implementation, the obtaining the second prediction result for the classification category of the second text based on the second fused vector and the second semantic vector by using the fully connected layer includes: splicing the second fused vector with the second semantic vector to obtain a second spliced vector; and processing the second spliced vector by using the fully connected layer, to obtain the second prediction result.

According to a third aspect, an apparatus for training a service model is provided. The service model includes an encoding network, a fusion layer, and a fully connected layer and is used to determine a text classification category. The apparatus includes: an acquisition unit, configured to obtain a first text from a training sample set, the first text corresponding to a text label, and the text label being determined from multiple candidate categories; an encoding unit, configured to process the first text by using the encoding network, to obtain a first semantic vector; a processing unit, configured to process the category hierarchical relationship network by using the graph convolutional network, to obtain category expression vectors respectively corresponding to candidate categories, where the category hierarchical relationship network includes nodes having a one-to-one correspondence with the candidate categories, candidate categories having a direct superior-inferior relationship are connected by a connection edge, each node corresponds to a respective node expression vector having a corresponding category feature vector as its initial value, the graph convolutional network is used to perform node expression vector aggregation of neighboring nodes for individual nodes to update corresponding node expression vectors, and the category expression vectors are node expression vectors corresponding to the nodes obtained through updating using the last layer of the graph convolutional network; a fusion unit, configured to fuse the category expression vectors based on the first semantic vector by using the fusion layer, to obtain a first fused vector for the first text; a prediction unit, configured to obtain a first prediction result for a classification category of the first text based on the first fused vector and the first semantic vector by using the fully connected layer; and an adjustment unit, configured to adjust model parameters in the encoding network, the graph convolutional network, the fusion layer, and the fully connected layer with an objective of consistency between the first prediction result and the text label, to train the service model.

According to a fourth aspect, an apparatus for determining a text classification category is provided, implemented by using a service model including an encoding network, a fusion layer, and a fully connected layer. The apparatus includes: a text acquisition unit, configured to obtain a second text for classification category determination; an encoding unit, configured to process the second text by using a pre-trained encoding network, to obtain a second semantic vector corresponding to the second text; a vector acquisition unit, configured to obtain category expression vectors respectively corresponding to candidate categories and obtained by processing the category hierarchical relationship network by using a pre-trained graph convolutional network, where the category hierarchical relationship network includes nodes having a one-to-one correspondence with the candidate categories, candidate categories having a direct superior-inferior relationship are connected by a connection edge, each node corresponds to a respective node expression vector having a corresponding category feature vector as its initial value, the graph convolutional network is used to perform node expression vector aggregation of neighboring nodes for individual nodes to update corresponding node expression vectors, and the category expression vectors are node expression vectors corresponding to the nodes obtained through updating using the last layer of the graph convolutional network; a fusion unit, configured to fuse the category expression vectors based on the second semantic vector by using the fusion layer, to obtain a second fused vector for the second text; a prediction unit, configured to obtain a second prediction result for describing a classification category of the second text based on the second fused vector and the second semantic vector by using the fully connected layer; and a determining unit, configured to determine the classification category of the second text based on the second prediction result.

According to a fifth aspect, a computer-readable storage medium is provided. The computer-readable storage medium stores a computer program, and when the computer program is executed in a computer, the computer is enabled to perform the method according to the first aspect or the second aspect.

According to a sixth aspect, a computing device is provided. The computing device includes a memory and a processor, the memory stores executable code, and when executing the executable code, the processor implements the method according to the first aspect or the second aspect.

According to the methods and apparatuses provided in the embodiments of the present specification, on the one hand, text is processed by using an encoding network to obtain a corresponding semantic vector; on the other hand, a relationship network is established for classification categories based on a hierarchical relationship, and the relationship network is processed by using a graph convolutional network, to fuse information of nodes to obtain category expression vectors. These two types of processing may or may not be independent from each other, and can be performed partially or completely in parallel, or performed in an ordered sequence. Then, the semantic vector of the text is fused with the category expression vectors to determine a prediction result of a classification category. In a phase of training a service model, the prediction result can be compared with a sample label to determine a loss and adjust model parameters. In a phase of determining a text classification category by using a trained service model, the corresponding classification category can be determined based on the prediction result. This processing manner makes full use of the hierarchical relationship between the classification categories, and therefore can improve classification accuracy.

BRIEF DESCRIPTION OF THE SEVERAL VIEWS OF THE DRAWINGS

To describe the technical solutions in the implementations of the present specification more clearly, the following briefly introduces the accompanying drawings needed for describing the implementations. Clearly, the accompanying drawings in the following description show merely some implementations of the present specification, and a person of ordinary skill in the art can still derive other drawings from these accompanying drawings without creative efforts.

DETAILED DESCRIPTION

The following describes the solutions provided in the present specification with reference to accompanying drawings.

Figure 1:
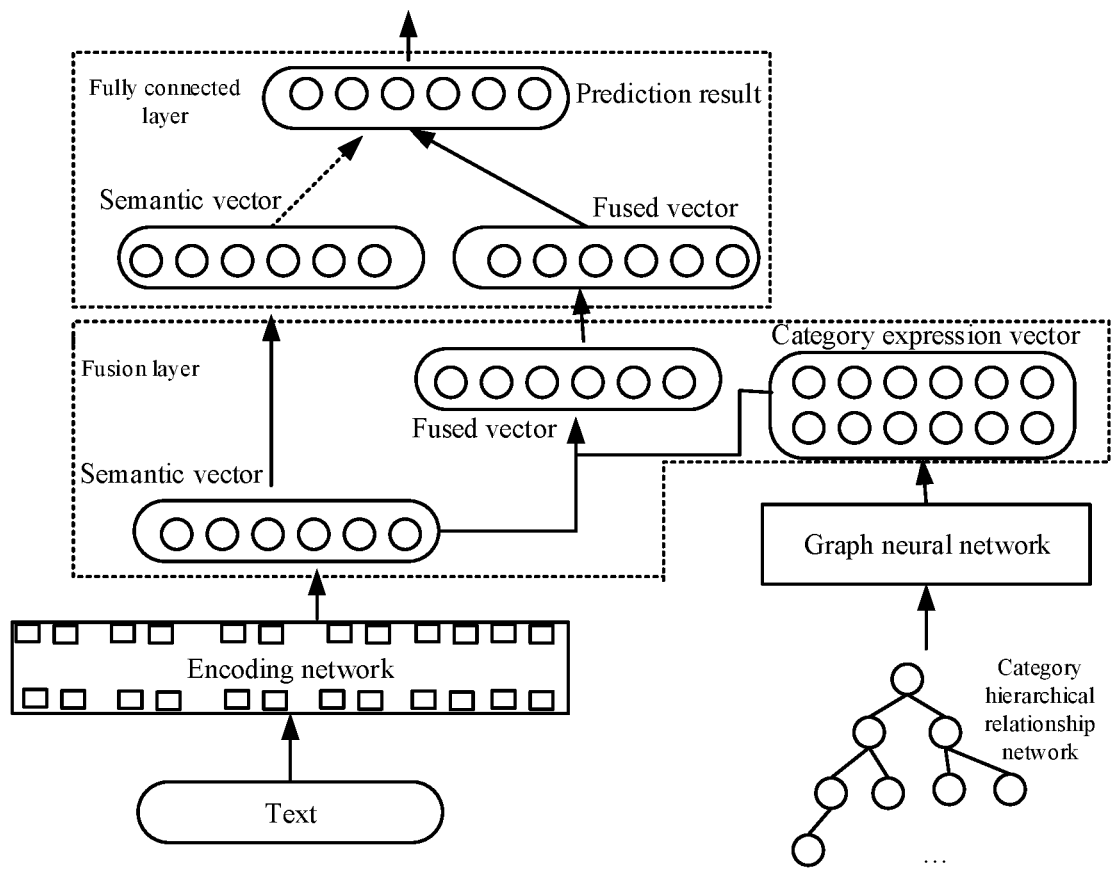
FIG. 1 is a schematic diagram illustrating an architecture for implementing a service model according to the present specification.

First, a specific implementation architecture is shown in FIG. 1 for description. In the implementation architecture of the present specification, text and categories having a hierarchical relationship are separately processed before fusion, so that a text category output result in combination with a category hierarchical relationship can be obtained.

It can be understood that the technical solutions provided in the present specification can be used in a scenario including various text categories or queries having a hierarchical relationship. For example, a text category corresponding to a description text of a commodity can be a search word, a key word, etc. For example, as described in the background, text "018 new products on sale! Men's and women's air cushion shoes!" corresponds to a classification category "e-commerce retail|clothes, shoes, and bags|sports shoes," including three levels from high to low: "e-commerce retail," "clothes, shoes, and bags," and "sports shoes." For another example, a classification category corresponding to a paper text in an academic database can also include multiple levels, such as a subject field (e.g., physics), a discipline branch (e.g., optics), and a specific research object (e.g., photovoltaic power generation).

As shown in FIG. 1, in the implementation architecture of the present specification, a service model can include at least an encoding network, a fusion layer, and a fully connected layer. A graph convolutional network (GCN) shown in FIG. 1 can be used as a part of the service model, or can be another model independent of the service model to cooperate with the service model to determine a text classification category.

Specifically, on the one hand, text (such as "018 new products on sale! Men's and women's air cushion shoes!") is processed by using the encoding network, to obtain a corresponding semantic vector; on the other hand, a category hierarchical relationship network including candidate categories of various levels can be processed by using the graph convolutional network, to determine category expression vectors respectively corresponding to the candidate categories.

The category hierarchical relationship network can be determined based on an association relationship between the candidate categories having a hierarchical relationship. The category hierarchical relationship network can include multiple nodes, and each node corresponds to one candidate category. If there is a direct hierarchical relationship between candidate categories, corresponding nodes are connected by a connection edge. For example, if candidate categories "e-commerce retail," "clothes, shoes, and bags," and "sports shoes" are sequentially arranged from a large category to a small category, the candidate categories are sequentially connected by using connection edges, to form a corresponding connection path. For example, the category hierarchical relationship network can be a tree structure, and a path in the tree structure is, for example, catering, Chinese food, Sichuan cuisine, and delicacies from mountains, the candidate category "delicacies from the mountains" of the lowest level corresponds to a leaf node.

Figure 2:
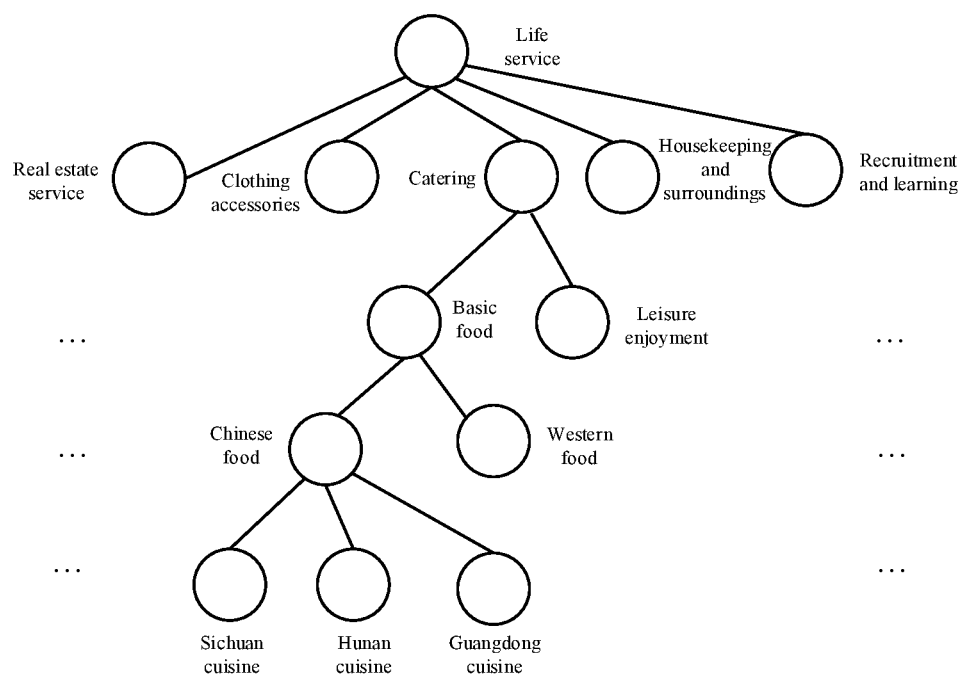
FIG. 2 is a schematic diagram illustrating a category hierarchical relationship network in a specific example.

As an example, references can be made to FIG. 2. FIG. 2 is a relationship network including various life service categories of a same-city online platform. In this relationship network, a root node is life service, including several major classifications, such as catering, clothing accessories, real estate service, housekeeping and surroundings, and recruitment and learning. The major classifications each include multiple further classifications. For example, catering can be classified into basic food and leisure enjoyment. The basic food can be further classified into Chinese food, western food, etc. The classifications are not listed one by one herein. If the next level of the candidate category "Chinese food" further includes Sichuan cuisine, Hunan cuisine, and Guangdong cuisine and is the lowest level, corresponding nodes are respectively leaf nodes. It can be understood that, when text is classified under a candidate category corresponding to a certain leaf node, the text also belongs to a category under categories on a path including the leaf nod. For example, if text "Yuxiang shredded pork" corresponds to a candidate category "Sichuan cuisine," the text can also correspond to candidate categories such as "Chinese food," "basic food," "catering," and "life service" and have features of the candidate categories.

Due to this hierarchical relationship between the classification categories, when candidate categories having a connection relationship are used as mutual neighboring nodes, if information of related neighboring nodes can be aggregated, a candidate categories corresponding to a current node can be more accurately expressed, thereby facilitating more accurate classification. Based on this consideration, in the present specification, each node can be described by using a category feature vector. In an implementation, the category feature vector can be, for example, a word vector of a candidate category phrase determined by using word2Vec, etc. In another implementation, a category feature vector in an initial relationship network can be a randomly generated vector with a predetermined number of dimensions or a vector including predetermined values. The category feature vector is usually a vector used to describe a feature of a candidate category.

In a process of processing a category hierarchical relationship network by using a graph convolutional network, for any node, for example, a first node, category feature vectors corresponding to neighboring nodes of the node and a category feature vector corresponding to the node can be fused as an initial node expression vector, to update a node expression vector of the first node. Herein, the node expression vector can be understood as a vector of a feature expressed by the corresponding node in the relationship network.

In some implementations, the node expression vector of the first node and node expression vectors of the neighboring nodes can be fused in various dimensions by calculating the largest value, average value, etc., to update the node expression vector of the first node.

In some implementations, the node expression vector of the first node and node expression vectors of the neighboring nodes can be fused through weighted summation, etc. The neighboring nodes can further correspond to different weight coefficients.

It can be understood that, when the graph convolutional network includes multiple layers, a fusion process of the node expression vectors of the neighboring nodes is iteratively performed. That is, a fusion process is performed at each layer based on an updated node expression vector result obtained at the previous layer.

As a specific example, when a relationship network is processed by using a graph convolutional network, a convolutional operator of a node expression vector of a first node (denoted as node v herein) at the $(l+1)^{th}$ layer can be determined as follows:

$$H^{l+1}(v) = \frac{1}{d_v} H^l(v) W^l + \sum_{u \in N(v)} \frac{1}{\sqrt{d_v d_u}} H^l(u) W^l + \ldots$$

In the equation, $H^{l+1}(v)$ is the node expression vector of node v at the $(l+1)^{th}$ layer of the graph convolutional network; N(v) is a neighboring node set of node v; each of $d_v$ and $d_u$ is a normalization factor, for example, a degree of a corresponding node, i.e., the number of connection edges connected to the corresponding node, or the number of first-order neighboring nodes; $H^l(v)$ is a node expression vector of node v at the $l^{th}$ layer of the graph convolutional network; $H^l(u)$ is a node expression vector of node u at the $l^{th}$ layer of the graph convolutional network; and $W^l$ is a model parameter of a corresponding node at the $l^{th}$ layer of the graph convolutional network. When there are multiple neighboring nodes, $W^l$ can be a model parameter in a matrix form, for example, a weight matrix. In the equation, expression vector aggregation of higher-order neighboring nodes of the current node can be further considered, and is represented by using an ellipsis herein. A principle of the expression vector aggregation is similar to the principle of the expression vector aggregation of the first-order neighboring nodes. Details are omitted herein for simplicity. It can be understood that a node expression vector at the previous layer of the first layer of the graph convolutional network can be a category feature vector of a corresponding candidate category, and a node expression vector at the previous layer of each of the following layers can be an updated node expression vector at the previous layer. For consistency, the category feature vector can be considered as a node expression vector at layer 0.

In some implementations, the node expression vectors of the neighboring nodes can be fused in another manner based on an actual situation, to update the node expression vector of the first node. Details are omitted herein for simplicity.

It can be understood that, in a process of updating the node expression vector of the first node, the node expression vector of the first node has an important contribution. Therefore, in some implementations, the first node can also be considered as a neighboring node of the first node. For example, in the above equation, if a node expression vector of node v is determined based on the node expression vector of node v and a node expression vector of a first-order neighboring node, the above equation can be alternatively denoted as:

$$H^{l+1}(v) = \sum_{u \in N(v)} \frac{1}{\sqrt{d_v d_u}} H^l(u) W^l$$

In the equation, a neighboring node set N(v) includes node v, and when v is taken as u, $$\frac{1}{\sqrt{d_v d_u}} H^l(u) W^l$$

can be denoted as $$\frac{1}{d_v} H^l(v) W^l.$$

As such, a final node expression vector of each node is obtained at the end of running of the graph convolutional network. Each final node expression vector is a vector including features expressed with reference to a hierarchical relationship between candidate categories. Therefore, the final node expression vector of each node can be used as a category expression vector of a corresponding candidate category.

It should be noted that, when candidate categories remain unchanged, connection relationships in a category hierarchical relationship network usually also remain unchanged. Therefore, category expression vectors can be pre-obtained by using a determined category hierarchical relationship network and a determined graph convolutional network to be used; or can be determined by using a current graph convolutional network and a current category hierarchical relationship network when text is processed or after a semantic vector of the text is obtained. The determined category hierarchical relationship network and the determined graph convolutional network herein mean that the same category hierarchical relationship network and the same graph convolutional network can be used for category prediction for any text at the current stage. Therefore, in some implementations, a category hierarchical relationship network can be pre-processed by using a graph convolutional network, to obtain category expression vectors respectively corresponding to candidate categories.

After a semantic vector of text is obtained by using an encoding vector and node expression vectors respectively corresponding to nodes are obtained, the node expression vectors can be fused together by using a fusion layer, to obtain a fused vector for the text. The fused vector is a result of fusing the category expression vectors. Then, the fused vector and the semantic vector can be further fused by using a fully connected layer, to obtain a prediction result for a classification category of the text. The prediction result can be used as a basis for determining the classification category of the text. For example, the prediction result can be a vector corresponding to the candidate categories, and each dimension describes the probability of being classified under a corresponding category. For another example, the prediction result can be a vector representation of a classification category. In this case, a specific candidate category corresponding to a category feature vector closer to a finally processed prediction result can be detected. Certainly, in process of training a service model, it is more desirable that a prediction result is consistent with a text label of a training sample.

As such, it can be seen from the framework of the present specification shown in FIG. 1 that, a category hierarchical relationship network including candidate categories is introduced, so that associations between category levels can be dug out and the candidate categories can be better expressed, thereby improving text classification accuracy.

FIG. 1 describes the technical framework of the present specification. The following separately describes the technical concept of the present specification in detail in terms of two aspects: training a service model and determining a text classification category by using a service model.

Figure 3:
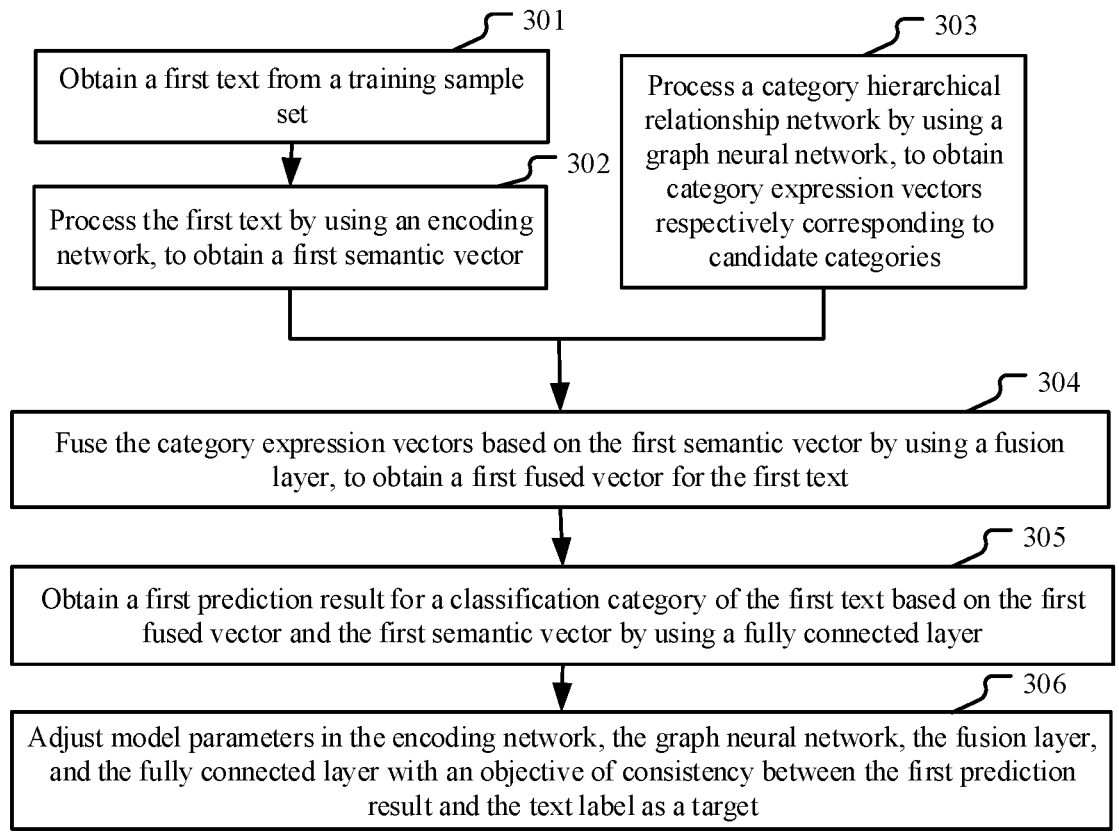
FIG. 3 is a flowchart illustrating a method for training a service model according to an implementation.

FIG. 3 illustrates a process of training a service model according to an implementation. The service model herein can be used to predict a text classification category, or can be used for text classification. The service model includes at least an encoding network, a fusion layer, and a fully connected layer. In some implementation, the service model can further include a graph convolutional network. The process can be executed by a computer, device, or server that has a specific computing capability.

As shown in FIG. 3, the process of training the service model can include the following steps: Step 301: Obtain a first text from a training sample set, the first text corresponding to a text label, and the text label being determined from multiple candidate categories. Step 302: Process the first text by using the encoding network, to obtain a first semantic vector. Step 303: Process a category hierarchical relationship network by using a graph convolutional network, to obtain category expression vectors respectively corresponding to candidate categories, where the category hierarchical relationship network includes nodes having a one-to-one correspondence with the candidate categories, candidate categories having a direct superior-inferior relationship are connected by a connection edge, each node corresponds to a respective node expression vector having a corresponding category feature vector as its initial value, the graph convolutional network is used to perform node expression vector aggregation of neighboring nodes for individual nodes to update corresponding node expression vectors, and the category expression vectors are node expression vectors corresponding to the nodes obtained through updating using the last layer of the graph convolutional network. Step 304: Fuse the category expression vectors based on the first semantic vector by using the fusion layer, to obtain a first fused vector for the first text. Step 305: Obtain a first prediction result for a classification category of the first text based on the first fused vector and the first semantic vector by using the fully connected layer. Step 306: Adjust model parameters in the encoding network, the graph convolutional network, the fusion layer, and the fully connected layer with an objective of consistency between the first prediction result and the text label, to train the service model.

First, in step 301, the first text is obtained from the training sample set. Herein, the first text can be a training sample in the training sample set, and content of the first text can be determined based on a service scenario. The first text can be, for example, a paper, a description title of a commodity or service, or a news article. As a training sample, the first text can further correspond to the text label, and the text label is determined from the multiple candidate categories. The candidate categories herein can be service-related categories. For example, candidate categories in life service can include "catering," "housekeeping and surroundings," "Chinese food," "western food," etc.

Usually, there can also be a hierarchical relationship between the categories. This hierarchical relationship can be used to sort out the text, or can be used to facilitate retrieval or search. In the hierarchical relationship between the categories, a large category usually can include multiple sub-categories. For example, the "Chinese food" category can include "Sichuan cuisine," "Guangdong cuisine," and "Hunan cuisine." Categories at all levels can be used as candidate categories. The first text can correspond to one or more text labels. In particular, if the first text corresponds to multiple text labels, when the first text corresponds to a certain small category, an upper-level candidate category of the small category can also be used as a text label corresponding to the first text. In an implementation, the text label corresponding to the first text specifically refers to a candidate category at the lowest level.

Next, in step 302, the first text is processed by using the encoding network, to obtain the first semantic vector. It can be understood that coding can be understood as converting an input sequence into a vector with a fixed length, and an encoding process can be used to parse a language meaning in an input character sequence. The encoding network can be implemented by using, for example, a DNN or a GBDT, or can be a network of an encode part in a Bert model.

Figure 4:
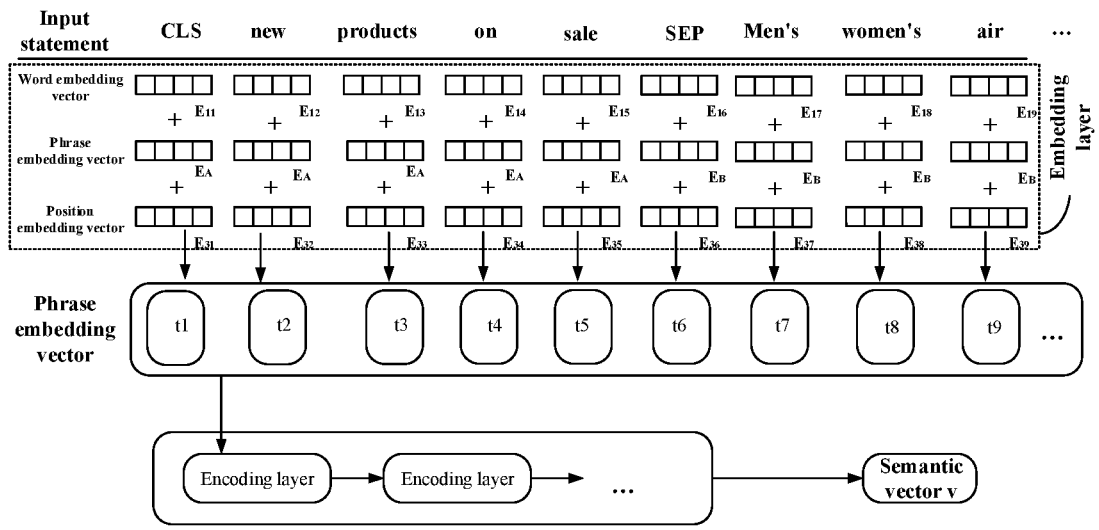
FIG. 4 is a schematic diagram illustrating a principle of an encoding network in a specific example.

The Bert model is used as an example. As shown in FIG. 4, the first semantic vector of the first text can be determined by using the following process. First, word segmentation processing is performed on the first text. The first text can be segmented word by word or phrase by phrase in the word segmentation processing. In some embodiments, pre-processing can be performed before the word segmentation, to remove at least one of a sensitive word, an invalid word, a space, a garbled code, etc. For example, as shown in FIG. 4, text "018 new products on sale! Men's and women's air cushion shoes!" can be pre-processed to remove invalid characters such as "018" and "!," and then text obtained after the pre-processing can be segmented word by word. In another implementation, the text can be segmented into "new products," "on sale," "men's," "women's," and "air cushion shoes" based on phrase. For ease of description, in the present specification, units obtained after segmentation can be collectively referred to as phrases regardless of whether the segmentation is performed word by word or phrase by phrase.

Then, an embedding vector of each phrase can be determined by using an embedding layer. As shown in FIG. 4, in Bert, an embedding vector of a single phrase usually can be determined based on at least one of a word embedding vector Token Embeddings, a paragraph embedding vector Segment Embeddings, a position embedding vector Position Embeddings, etc. of a corresponding word or phrase. Generally, the position embedding vector is an important feature that indicates a phrase order in a sentence in an NLP (Natural Language Processing), and can be determined by encoding position information (for example, a character position) of a phrase, and BERT can be let to perceive a position relationship between words/phrases, which can be obtained through model learning; the word embedding vector can be a word vector of a corresponding character determined based on a word vector model through pre-training by using a corpus, and the word vector model herein can be a model such as one-hot (one-hot) or word2vec; and the paragraph embedding vector can be an embedding vector of a whole paragraph corresponding to phrases, and is used to represent segmentation of a spliced text, for example, one paragraph embedding vector is assigned to each of statements separated by punctuation, and a corresponding paragraph embedding vector can be used for a single character.

As shown in FIG. 4, t1, t2, t3, . . . are used to represent phrase embedding vectors finally obtained at the embedding layer. After the phrase embedding vectors are obtained, the phrase embedding vectors can be processed by using multiple encoding layers, to obtain semantic vector v. The encoding layer can be implemented by using, for example, a transformer. The transformer encoding layer can perform semantic association analysis on the phrases based on an attention mechanism. Details are omitted herein for simplicity. Expression vectors fused with other phrase information respectively corresponding to the multiple phrases can be obtained by using the multiple encoding layers. A vector at a specific position (for example, a CLS position in FIG. 4) can be selected as the semantic vector of the text; or the phrase expression vectors can be fused together by using a predetermined method (for example, summation, averaging, and splicing and then processing by using a fully connected network) to obtain the semantic vector of the text. This is not limited herein. Semantic vector v can be considered as a feature vector extracted from the corresponding text, or can be considered as an abstract expression vector of the corresponding text. For the first text, an obtained semantic vector can be referred to as the first semantic vector.

On the other hand, in step 303, the category hierarchical relationship network is processed by using the graph convolutional network, to obtain the category expression vectors respectively corresponding to the candidate categories. The category hierarchical relationship network is used to describe the hierarchical relationship between the candidate categories by using nodes in the one-to-one correspondence with the candidate categories, and is, for example, a relationship network of a tree structure shown in FIG. 2. The nodes in the category hierarchical relationship network can further respectively correspond to category feature vectors of the corresponding candidate categories. The category feature vectors can be used to describe semantic features of the corresponding candidate categories.

A single-layer neural network of the graph convolutional network can perform node expression vector aggregation of neighboring nodes in the category hierarchical relationship network, and update the node expression vectors of the nodes at the current layer. At the first layer, the category feature vectors corresponding to the nodes can be used as the initial node expression vectors, to perform expression vector fusion on the neighboring nodes. Initially, the category feature vector can be, for example, a word vector determined by using a word2Vec model, one-hot, etc., or can be a random vector. This is not limited herein. The random vector can be adjusted in the process of training the service model, and the phrase vector determined by using the word2Vec model, one-hot, etc. can remain unchanged.

The processing performed by the graph convolutional network on the category hierarchical relationship network is described above in detail. Details are not repeated herein. After the processing performed by the graph convolutional network, final node expression vectors of the node can be obtained as the category expression vectors of the corresponding candidate categories.

It should be noted that, in an implementation of the present specification, to facilitate subsequent processing, the category expression vector and the first semantic vector can have same dimensions, for example, both have 100 dimensions.

In step 304, the category expression vectors are fused based on the first semantic vector by using the fusion layer, to obtain the first fused vector for the first text. It can be understood that the category expression vectors are respectively fused with semantic features of the corresponding candidate categories in respective neighboring nodes. To predict the classification category corresponding to the first text, the category expression vectors need to be analyzed based on the first semantic vector of the first text.

To analyze the category expression vectors, the technical concept of the present specification proposes a method for fusing category expression vectors based on a semantic vector of a text. That is, for the first text, the category expression vectors corresponding to the candidate categories are fused together based on degrees of association between the category expression vectors and the first semantic vector.

In some implementations, first degrees of similarity between the category expression vectors and the first semantic vector can be detected, weights can be determined based on the first degrees of similarity, and weighted summation can be performed on the category expression vectors, to fuse the category expression vectors to obtain the first fused vector for the first text. The weights corresponding to the category expression vectors are positively correlated with the first degrees of similarity corresponding to the category expression vectors, and are, for example, the corresponding first degrees of similarity or normalized results of the first degrees of similarity.

Herein, the "first" in the first degree of similarity is a description corresponding to the first text, and has no substantial impact on an actual meaning (for example, it can be interpreted as follows: The first text further corresponds to a second degree of similarity). The description is applicable to the following.

In some implementations, the category expression vectors can be combined into a category vector matrix, and then the category vector matrix can be processed by using the first semantic vector, to fuse the category expression vectors. For example, if the number of the candidate categories (consistent with the number of the nodes) is n and a single category expression vector can be denoted as an s-dimensional column vector (a row vector can be transposed into a column vector), an s-row and n-column category vector matrix can be formed. Each column corresponds to one candidate category. The first semantic vector is consistent with the category expression vector in dimension and has s dimensions. The text semantic vector can be denoted as an s-dimensional row vector (or can be a 1-row and s-column matrix). If the first semantic vector is a column vector, the first semantic vector is transposed into an s-dimensional row vector. Therefore, if the first semantic vector is multiplied by the category vector matrix, a 1-row and n-column intermediate vector is obtained. The 1-row and n-column intermediate vector is also referred to as an n-dimensional intermediate vector. Each dimension in the intermediate vector is a product scalar of the first semantic vector and a corresponding category expression vector, and the scalar can measure an importance degree of the corresponding category expression vector relative to the first semantic vector.

The intermediate vector is denoted as k, the first semantic vector is denoted as v, and the category vector matrix is denoted as T=(t1, t2, t3, ... ). t1, t2, t3, ... are respectively s-dimensional category expression vectors. In a specific example, k can be represented as follows:

$$k = \text{Softmax}(vT)$$

In the equation, Softmax is an activation function or a mapping function, and is used to map a result to a predetermined interval. As such, $i^{th}$-dimensional element k of k can be determined based on $vt_i$ and can be used to measure an importance degree of a corresponding category expression vector relative to the first semantic vector.

Further, weighted fusion can be performed on the category expression vectors based on importance degrees indicated by the intermediate vector k, to obtain the first fused vector of the relationship network for the first text.

For example, if the first fused vector is denoted as a, $$a = \sum_{j}^{n} k_j * t_j$$

In the equation, $t_j$ represents the $j^{th}$ node expression vector, $k_j$ represents the $j^{th}$ element of the intermediate vector k, and the equation represents summation performed from 1 to n based on j.

It can be understood that the first fused vector herein is obtained through fusion based on the first semantic vector of the first text, and can be understood as a personalized comprehensive category vector representation for the first text. Therefore, the first fused vector has an important reference value for category prediction of the first text.

Further, in step 305, the first prediction result for the classification category of the first text is obtained based on the first fused vector and the first semantic vector by using the fully connected layer. It can be understood that the first semantic vector includes a semantic feature of the first text, and the first fused vector includes hierarchical features of the candidate categories in the category hierarchical relationship network and importance features relative to the first text. Therefore, the first semantic vector and the first fused vector can be fused to determine the classification category of the first text.

In some implementations, the first fused vector and the first semantic vector can be superimposed, and then a vector obtained after the superimposing is processed by using the fully connected layer to obtain the prediction result.

In some implementations, the first fused vector and the first semantic vector can be spliced together, and then a vector obtained after the splicing is processed by using the fully connected layer to obtain the prediction result.

In some implementations, after the first fused vector and the first semantic vector are processed in another manner, a vector obtained after the processing is processed by using the fully connected layer to obtain the prediction result. Details are omitted here for simplicity.

Generally, the fully connected layer means that each neuron in the previous layer is connected to neurons in the current layer based on different weights (model parameters). The first fused vector and the first semantic vector can be deeply fused by using the fully connected layer.

It should be noted that the prediction result can be in a value form, or can be in a vector form. The value form can be, for example, a value corresponding to a candidate category, or the probability of being classified under one of categories in binary classification. The vector form can be, for example, a probability vector in which dimensions are in a one-to-one correspondence with all the candidate categories or some candidate categories (for example, candidate categories corresponding to leaf nodes in a tree structure), each dimension representing the probability of being classified under a corresponding candidate category; or a prediction semantic vector consistent with the category feature vector in dimension, used to match the category feature vector.

Then, in step 306, the model parameters in the encoding network, the graph convolutional network, the fusion layer, and the fully connected layer are adjusted with the objective of consistency between the first prediction result and the text label, to train the service model. It can be understood that, as an output result of the service model, the prediction result can correspond to the classification category of the first text. In the process of training the service model, it is expected that the prediction result is consistent with the text label that describes the classification category of the first text.

In some implementations, if the candidate categories are respectively represented by using different values and the prediction result in step 305 is one of these different values, the model parameters can be adjusted to a direction in which the prediction result is consistent with a value corresponding to the text label.

In some implementations, if each candidate category corresponds to one vector being 1 in a certain dimension, and dimensions of the vector are consistent with all the candidate categories or some candidate categories (for example, candidate categories corresponding to leaf nodes in a tree structure) in number, the prediction result is consistent with the text label, which can indicate that a prediction result vector is consistent with a vector corresponding to the text label.

In some implementations, if the prediction result can be a semantic vector that expresses the classification category of the first text, the prediction result is consistent with a description vector of a category corresponding to the text label of the first text, i.e., a category feature vector of a candidate category corresponding to the text label, which can indicate that the prediction result is consistent with the text label.

In some implementations, it can be determined that the prediction result is consistent with the text label in other manners. The manners are not listed one by one herein. Further, the model parameters in the service model can be adjusted with the objective of consistency between the prediction result and the text label.

It can be understood that the service model includes the encoding network, the fusion layer, and the fully connected layer, and corresponding model parameters can include all model parameters in the encoding network, the fusion layer, and the fully connected layer. Based on the descriptions of step 301 to step 305, in the process of training the service model, the graph convolutional network also has some model parameters. These model parameters are crucial for the prediction result, and the problem becomes complicated if these parameters are determined by using only the graph convolutional network. Therefore, the model parameters in the process of training the service model can also include one or more of the model parameters in the graph convolutional network, such as a weight matrix or the initial node expression vectors (i.e., the category feature vectors). In some embodiments, the graph convolutional network can also be used as a part of the service model.

According to some designs, a loss can be determined by using a cross entropy method, and the model parameters can be adjusted to a reduction direction of the loss. For example, form training samples, a loss can be measured in the following manner:

$$L = -\frac{1}{|V|}\sum_{u \in V} y_u \log(Y_u)$$

In the equation, V represents a training sample set of the current batch, $y_u$ represents a value or a vector that describes a text category corresponding to training sample u, and $Y_u$ represents a prediction result determined for sample u.

It can be understood that, at the end of the model training, various parameters in the graph convolutional network are determined. In addition, for all to-be-predicted texts, model parameters in the graph convolutional network can be fixed. When the candidate categories are fixed and the category feature vectors corresponding to the candidate categories are also fixed, a result of processing the relationship network by the graph convolutional network is also fixed. That is, the category expression vectors respectively corresponding to the candidate categories can be used repeatedly for multiple texts. Therefore, in use, the graph convolutional network can be considered as a model independent of the service model. In some implementations, in use, the relationship network can be pre-processed by using the graph convolutional network, to obtain a common processing result, that is, the final node expression vectors respectively corresponding to the nodes.

It can be understood by a person skilled in the art that, if the initial category feature vectors are word vectors determined by using a method such as word2Vec or one-hot and can express specific meanings, the category feature vectors remain unchanged in the process of training the service model. However, if the initial category feature vectors are random vectors and have no actual meanings, the category feature vectors need to be adjusted together with the model parameters in the model training process. When the model training ends, the category feature vectors and other model parameters in the graph convolutional network are determined.

It should be noted that in the process of training the service model, multiple training samples may be involved in one process of adjusting model parameters. In this case, after semantic vectors of the multiple training sample texts are obtained, the semantic vectors can be fused with the category expression vectors together. For example, an m-row and s-column semantic vector matrix including m text semantic vectors is multiplied by an s-row and n-column label vector matrix corresponding to n candidate categories, to obtain an m-row and n-column intermediate matrix. Each row of the intermediate matrix corresponds to one training sample. Each element in a single row represents an importance degree of a corresponding candidate category relative to text corresponding to the row.

Figure 5:
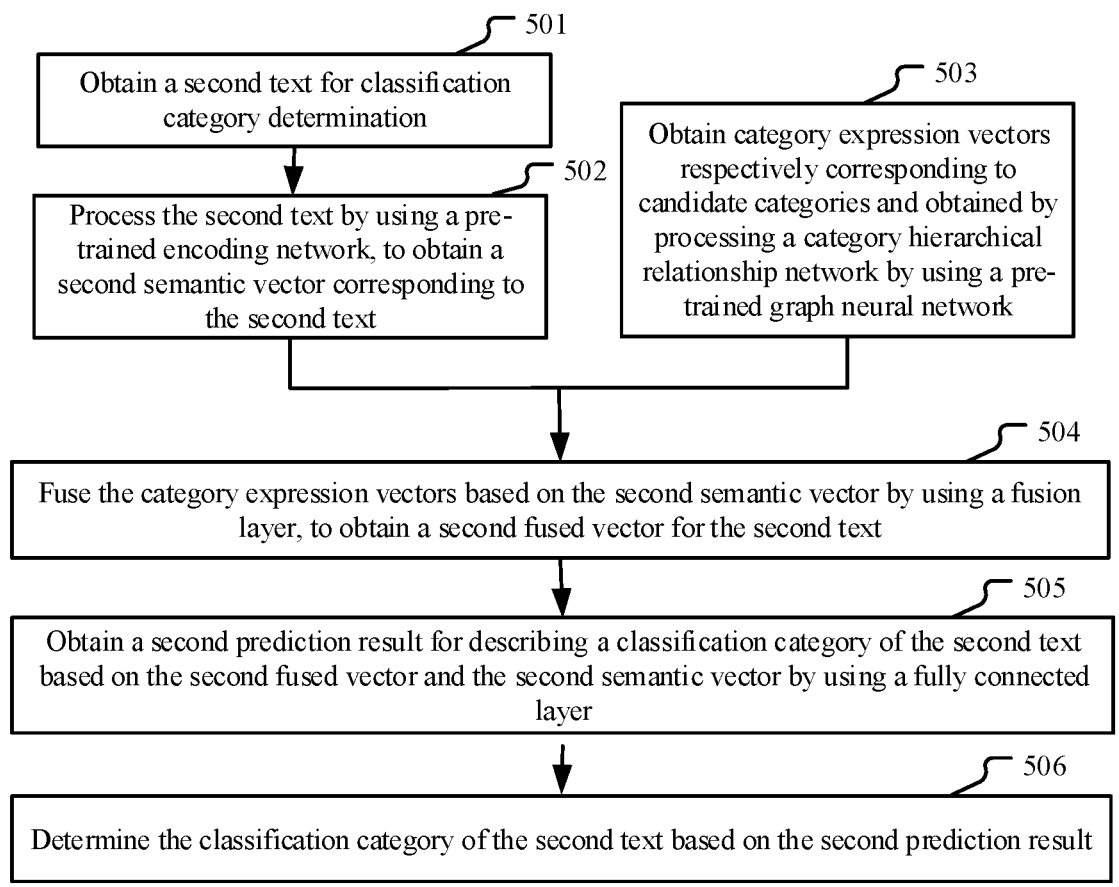
FIG. 5 is a flowchart illustrating a method for determining a text classification category according to an implementation.

On the other hand, an implementation of the present specification further provides a method for determining a text classification category. FIG. 5 illustrates a specific example of the method process. The method for determining a text classification category can be implemented by using a service model including at least an encoding network, a fusion layer, and a fully connected layer. The service model can be trained by using, for example, the process shown in FIG. 3. Details are omitted herein for simplicity.

As shown in FIG. 5, the process for determining a text classification category can include the following steps: Step

501: Obtain a second text for classification category determination. Step 502: Process the second text by using a pre-trained encoding network, to obtain a second semantic vector corresponding to the second text. Step 503: Obtain category expression vectors respectively corresponding to candidate categories and obtained by processing a category hierarchical relationship network by using a pre-trained graph convolutional network, where the category hierarchical relationship network includes nodes having a one-to-one correspondence with the candidate categories, candidate categories having a direct superior-inferior relationship are connected by a connection edge, each node corresponds to a respective node expression vector having a corresponding category feature vector as its initial value, the graph convolutional network is used to perform node expression vector aggregation of neighboring nodes for individual nodes to update corresponding node expression vectors, and the category expression vectors are node expression vectors corresponding to the nodes obtained through updating using the last layer of the graph convolutional network. Step 504: Fuse the category expression vectors based on the second semantic vector by using the fusion layer, to obtain a second fused vector for the second text. Step 505: Obtain a second prediction result for describing a classification category of the second text based on the second fused vector and the second semantic vector by using the fully connected layer. Step 506: Determine the classification category of the second text based on the second prediction result.

First, in step 501, the second text with the to-be-determined classification category is obtained. It can be understood that the second text can be various texts related to a service scenario. The second text can be, for example, a paper, a description title of a commodity or service, or a news article.

Then, in step 502, the second text is processed by using the pre-trained encoding network, to obtain the second semantic vector corresponding to the second text. The encoding network can convert an input sequence into a vector with a fixed length, and an encoding process can be used to parse a language meaning in an input character sequence. The encoding network can be implemented by using, for example, a DNN or a GBDT, or can be a network of an encode part in a Bert model.

Herein, the encoding network can be trained by using the process shown in FIG. 3. For the second text, the input sequence of the encoding network can be phrases obtained after phrase segment or word segment processing is performed on the second text. In some embodiments, the second text can be pre-processed, to remove at least one of a sensitive word, an invalid word, a space, a garbled code, etc. A process of processing the second text by the encoding network is similar to the process of processing the first text by the encoding network. Details are omitted herein for simplicity.

On the other hand, in step 503, the category expression vectors respectively corresponding to the candidate categories and obtained by processing the category hierarchical relationship network by using the pre-trained graph convolutional network are obtained. The category hierarchical relationship network herein is determined by using the candidate categories for the service scenario of the second text. It can be understood that different service scenarios can correspond to different candidate service categories. For example, in a scenario of storing or retrieving an academic paper, corresponding candidate categories can include physics subject, optics branch, photovoltaic power generation, biology subject, origin of species, etc. In a specific example shown in FIG. 2, candidate categories of a same-city online life service platform can include catering, clothing accessories, real estate service, housekeeping and surroundings, recruitment and learning, etc. Usually, there is a hierarchical relationship between these candidate categories, which can be described by using a relationship network such as a tree structure. In the category hierarchical relationship network, the nodes respectively correspond to the candidate categories, and nodes corresponding to candidate categories having a superior-inferior relationship are connected by a connection edge.

The relationship network that describes the hierarchical relationship between the candidate categories can be processed by using the trained graph convolutional network, to fuse the candidate categories with features of neighboring nodes. An initial feature of each node can be described by using a corresponding category feature vector.

It can be understood that the category feature vector can be a word vector determined by using a method such as word2Vec, or can be a vector determined by adjusting a generated random vector in a process of training the graph convolutional network. Regardless of an acquisition form of an initial category feature vector, for a fixed category hierarchical relationship network, when training of the graph convolutional network is completed, all category feature vectors are determined, and network parameters (such as the above $W^l$) in the graph convolutional network are also determined. In this case, a result obtained after iterative neighboring vector fusion performed by the graph convolutional network by using the category feature vectors as initial node expression vectors of nodes is also determined. Therefore, in this process, the category expression vectors can be determined by pre-processing category expression vectors by using the trained graph convolutional network. In step 503, the category expression vectors can be directly obtained.

Then, in step 504, the category expression vectors are fused based on the second semantic vector by using the fusion layer, to obtain the second fusion result for the second text. It can be understood that the category expression vectors respectively describe semantic features of the corresponding candidate categories in combination with neighboring nodes. To determine the classification category corresponding to the second text, the category expression vectors need to be analyzed based on the second semantic vector.

In some implementations, second degrees of similarity between the category expression vectors and the second semantic vector can be detected, and weighting weights can be determined based on the second degrees of similarity, so that weighted summation can be performed on the category expression vectors to fuse the category expression vectors. A fused vector for the second text can be referred to as the second fused vector. The weighting weight of a single category expression vector can be positively correlated with a corresponding second degree of similarity, and is, for example, a normalized result of the second degree of similarity.

It should be noted that the "second" in the "second degree of similarity" herein is intended to correspond to the "second text," without substantially limiting the degree of similarity.

In some implementations, the category expression vectors can be combined into a category vector matrix, and then the category vector matrix can be processed based on the second semantic vector, to fuse the category expression vectors. In some embodiments, importance degrees of the candidate categories relative to the second text can be determined based on a product of the second semantic vector and a label vector matrix, and the category expression vectors are fused through weighted summation based on weights determined based on the importance degrees. The process is similar to the description in step 304. Details are omitted herein for simplicity.

In some implementations, the category expression vectors can be fused in another reasonable manner. This is not limited in the present specification.

Further, in step 505, the second prediction result for the second text is obtained based on the second fused vector and the second semantic vector by using the fully connected layer. It can be understood that the second semantic vector includes a semantic feature of the second text, and the second fused vector includes hierarchical features of the candidate categories in the category hierarchical relationship network and importance features relative to the second text. Therefore, the second semantic vector and the second fused vector can be fused to determine the second prediction result for describing the classification category of the second text.

In practice, the second fused vector and the second semantic vector can be superposed, and then a vector obtained after the superposing can be processed by using the fully connected layer, to obtain the second prediction result; or the second fused vector and the second semantic vector can be spliced together, and then a vector obtained after the splicing can be processed by using the fully connected layer, to obtain the second prediction result; or after the second fused vector and the second semantic vector are processed in another manner (for example, by using only the fully connected layer), a vector obtained after the processing can be processed by using the fully connected layer, to obtain the second prediction result. This is not limited herein.

Parameters such as weights in the fully connected layer can be determined through adjustment based on the process shown in FIG. 3. The second prediction result can be in a value form or a vector form. Details are omitted herein for simplicity.

Then, in step 506, the classification category of the second text is determined based on the second prediction result. It can be understood that, as an output result of the service model for the second text classification, the second prediction result is a description of the classification category of the second text. Therefore, the classification category of the second text can be determined based on the second prediction result.

When the second prediction result is in a value form, a candidate category corresponding to the value can be used as the classification category of the second text.

When the second prediction result is in a vector form: in an implementation, each dimension in the second prediction result vector corresponds to the probability of classifying the second text under a corresponding candidate category, and a candidate category corresponding to a dimension with the largest probability value can be determined as the classification category of the second text; or in another implementation, the second prediction result vector is a semantic description of the classification category of the second text, the second prediction result vector can be matched with the category feature vectors corresponding to the candidate categories, and a candidate category corresponding to a category feature vector more similar to the second prediction result vector is closer to the classification category of the second text.

A vector matching result can be measured based on similarity between two vectors, such as a cosine distance, variance, dot product, etc. For example, the degree of similarity is negatively correlated with the variance, positively correlated with the cosine distance, and positively correlated with the dot product. If the second prediction result and the category feature vectors are respectively measured by using third degrees of similarity, the classification category of the second text can be determined based on at least one third degree of similarity with the largest value. The "third" in the "third degree of similarity" herein is used to distinguish from the above "first" and "second," without substantial limitation. It can be understood that, according to a possible design, multiple candidate options can be output for the classification category of the second text. Therefore, when the classification category of the second text is determined herein, a candidate category corresponding to at least one third degree of similarity with the largest value can be selected.

In some implementations, a similarity degree distribution vector can be obtained by using a product of the second prediction result vector and a category feature matrix including the category feature vectors. A processing manner of the product of the second prediction result vector and the category feature matrix is similar to the processing manner of the product of the first text vector and the category vector matrix described in step 303. Details are omitted herein for simplicity. Each element in the degree of similarity distribution vector can measure a degree of similarity between a corresponding category feature vector and the second prediction result vector. For example, a degree of similarity between each category feature vector and the second prediction result vector is positively correlated with a corresponding element in the degree of similarity distribution vector. Then, the classification category of the second text can be determined based on at least one element with the largest value in the degree of similarity distribution vector.

In the above processes, according to the methods for training a service model and determining a text classification category provided in the implementations of the present specification, on the one hand, text is processed by using an encoding network to obtain a corresponding semantic vector; on the other hand, a relationship network is established for classification categories based on a hierarchical relationship, and the relationship network is processed by using a graph convolutional network, to fuse information of nodes to obtain category expression vectors. Then, the semantic vector of the text is fused with the category expression vectors to determine a prediction result of a classification category. In a phase of training a service model, the prediction result can be compared with a sample label to determine a loss and adjust model parameters. In a phase of determining a text classification category by using a trained service model, the corresponding classification category can be determined based on the prediction result. This processing manner makes full use of the hierarchical relationship between the classification categories, and therefore can improve classification accuracy.

Figure 6:
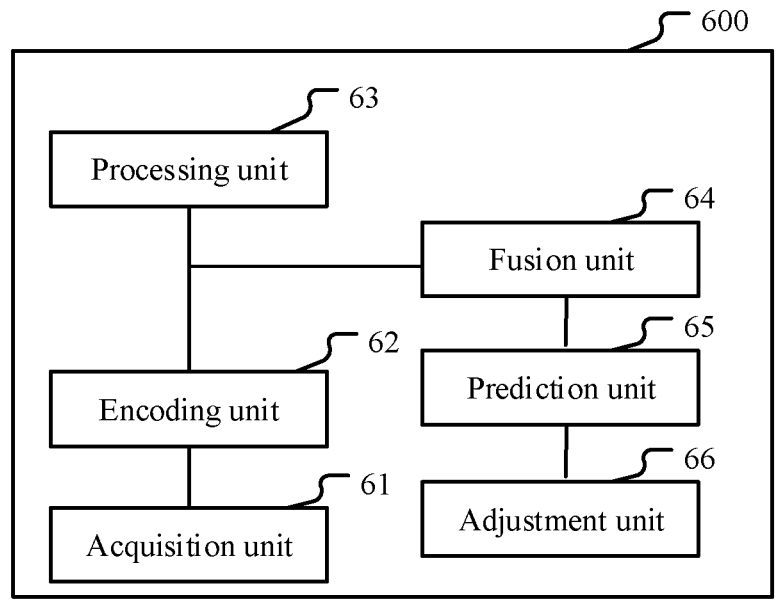
FIG. 6 is a schematic block diagram illustrating an apparatus for training a service model according to an implementation.

According to another aspect, an implementation further provides an apparatus for training a service model. The service model can include an encoding network, a fusion layer, and a fully connected layer and is used to determine a text classification category. The apparatus can be disposed in a computer, device, or server that has a specific computing capability. FIG. 6 is a schematic block diagram illustrating an apparatus for training a service model according to an implementation.

As shown in FIG. 6, an apparatus 600 includes: an acquisition unit 61, configured to obtain a first text from a training sample set, the first text corresponding to a text label, and the text label being determined from multiple candidate categories; an encoding unit 62, configured to process the first text by using the encoding network, to obtain a first semantic vector; a processing unit 63, configured to process the category hierarchical relationship network by using the graph convolutional network, to obtain category expression vectors respectively corresponding to candidate categories, where the category hierarchical relationship network includes nodes having a one-to-one correspondence with the candidate categories, candidate categories having a direct superior-inferior relationship are connected by a connection edge, each node corresponds to a respective node expression vector having a corresponding category feature vector as its initial value, the graph convolutional network is used to perform node expression vector aggregation of neighboring nodes for individual nodes to update corresponding node expression vectors, and the category expression vectors are node expression vectors corresponding to the nodes obtained through updating using the last layer of the graph convolutional network; a fusion unit 64, configured to fuse the category expression vectors based on the first semantic vector by using the fusion layer, to obtain a first fused vector for the first text; a prediction unit 65, configured to obtain a first prediction result for a classification category of the first text based on the first fused vector and the first semantic vector by using the fully connected layer; and an adjustment unit 66, configured to adjust model parameters in the encoding network, the graph convolutional network, the fusion layer, and the fully connected layer with an objective of consistency between the first prediction result and a category feature vector corresponding to the text label, to train the service model.

In some implementations, the number of dimensions of the first semantic vector and the number of dimensions of the category expression vector are both s, and the fusion unit 64 can be further configured to: compare the first semantic vector with the category expression vectors to determine first degrees of similarity between the category expression vectors and the first semantic vector; and perform weighted summation on the category expression vectors by using the first degrees of similarity, to obtain the first fused vector, weights of the category expression vectors being positively correlated with the corresponding first degrees of similarity.

In some implementations, the number of the candidate categories is n, the number of dimensions of the first semantic vector and the number of dimensions of the category expression vector are both s, and the fusion unit 64 can be further configured to: obtain (a) an s-dimensional row vector corresponding to the first semantic vector and (b) an s-row and n-column category vector matrix formed by sequentially arranging the n category expression vectors; determine an n-dimensional intermediate vector based on a product of the s-dimensional row vector and the s-row and n-column category vector matrix; and perform weighted averaging on the category expression vectors by using respective elements in the n-dimensional intermediate vector as weighting weights of the corresponding candidate categories, to obtain the first fused vector.

According to some implementations, the prediction unit 65 can be further configured to: splice the first fused vector with the first semantic vector to obtain a first spliced vector; and process the first spliced vector by using the fully connected layer, to obtain the first prediction result.

It should be noted that the apparatus 600 shown in FIG. 6 is an apparatus implementation corresponding to the method implementation shown in FIG. 3. Corresponding descriptions in the method implementation shown in FIG. 3 are also applicable to the apparatus 600. Details are omitted herein for simplicity.

Figure 7:
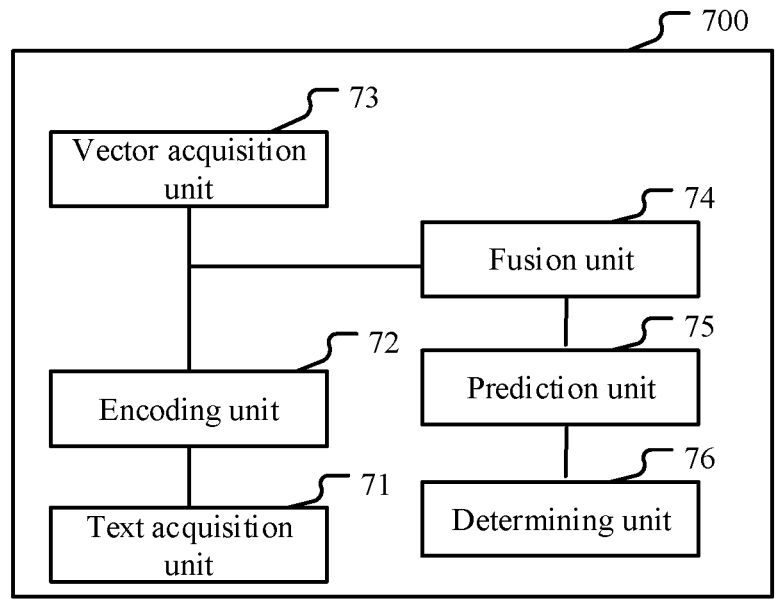
FIG. 7 is a schematic block diagram illustrating an apparatus for determining a text classification category according to an implementation.

According to yet another aspect, an implementation further provides an apparatus for determining a text classification category. The apparatus determines a text classification category by using a service model including an encoding network, a fusion layer, and a fully connected layer. The apparatus can be disposed in a computer, device, or server that has a specific computing capability. FIG. 7 is a schematic block diagram illustrating an apparatus for determining a text classification category according to an implementation.

As shown in FIG. 7, an apparatus 700 includes: a text acquisition unit 71, configured to obtain a second text for classification category determination; an encoding unit 72, configured to process the second text by using a pre-trained encoding network, to obtain a second semantic vector corresponding to the second text; a vector acquisition unit 73, configured to obtain category expression vectors respectively corresponding to candidate categories and obtained by processing the category hierarchical relationship network by using a pre-trained graph convolutional network, where the category hierarchical relationship network includes nodes having a one-to-one correspondence with the candidate categories, candidate categories having a direct superior-inferior relationship are connected by a connection edge, each node corresponds to a respective node expression vector having a corresponding category feature vector as its initial value, the graph convolutional network is used to perform node expression vector aggregation of neighboring nodes for individual nodes to update corresponding node expression vectors, and the category expression vectors are node expression vectors corresponding to the nodes obtained through updating using the last layer of the graph convolutional network; a fusion unit 74, configured to fuse the category expression vectors based on the second semantic vector by using the fusion layer, to obtain a second fused vector for the second text; a prediction unit 75, configured to obtain a second prediction result for describing a classification category of the second text based on the second fused vector and the second semantic vector by using the fully connected layer; and a determining unit 76, configured to determine the classification category of the second text based on the second prediction result.

In some implementations, the number of dimensions of the second semantic vector and the number of dimensions of the category expression vector are both s, and the fusion unit 74 is further configured to: compare the second semantic vector with the category expression vectors to determine second degrees of similarity between the category expression vectors and the second semantic vector; and perform weighted summation on the category expression vectors by using the second degrees of similarity, to obtain the second fused vector, weights of the category expression vectors being positively correlated with the corresponding second degrees of similarity.

In some implementations, the number of the candidate vectors is n, the number of dimensions of the second semantic vector and the number of dimensions of the category expression vector are both s, and the fusion unit 74 is further configured to: obtain (a) an s-dimensional row vector corresponding to the second semantic vector and (b) an s-row and n-column category vector matrix formed by sequentially arranging the n category expression vectors; determine an n-dimensional intermediate vector based on a product of the s-dimensional row vector corresponding to the second semantic vector and the s-row and n-column category vector matrix; and perform weighted averaging on the category expression vectors by using respective elements in the n-dimensional intermediate vector as weighting weights of the corresponding candidate categories, to obtain the second fused vector.

In some implementations, the prediction unit 75 is further configured to: splice the second fused vector with the second semantic vector to obtain a second spliced vector; and process the second spliced vector by using the fully connected layer, to obtain the second prediction result.

It should be noted that the apparatus 700 shown in FIG. 7 is an apparatus implementation corresponding to the method implementation shown in FIG. 5. Corresponding descriptions in the method implementation shown in FIG. 5 are also applicable to the apparatus 700. Details are omitted herein for simplicity.

According to another aspect, an implementation further provides a computer-readable storage medium. The computer-readable storage medium stores a computer program, and when the computer program is executed in a computer, the computer is enabled to perform the method described with reference to FIG. 3 or FIG. 5.

According to still another aspect, an implementation further provides a computing device. The computing device includes a memory and a processor, the memory stores executable code, and when executing the executable code, the processor implements the method described with reference to FIG. 3 or FIG. 5.

A person skilled in the art should be aware that in the above one or more examples, the functions described in the implementations of the present specification can be implemented by using hardware, software, firmware, or any combination thereof. When the functions are implemented by using software, the functions can be stored in a computer-readable medium or transmitted as one or more instructions or code in the computer-readable medium.

The objectives, technical solutions, and beneficial effects of the present specification are further described in detail in the above specific implementations. It should be understood that the above descriptions are merely specific implementations of the technical concept of the present specification, but are not intended to limit the protection scope of the technical concept of the present specification. Any modification, equivalent replacement, improvement, etc. made based on the technical solutions in the implementations of the present specification shall fall within the protection scope of the technical concept of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for training a service model, wherein the service model includes an encoding network, a fusion layer, and a fully connected layer and wherein the method comprises:
    obtaining a first text from a training sample set, the first text corresponding to a text label, and the text label being determined from a plurality of candidate categories;
    processing the first text by using the encoding network, to obtain a first semantic vector;
    processing a category hierarchical relationship network by using a graph convolutional network, to obtain category expression vectors respectively corresponding to a plurality of candidate categories, wherein the category hierarchical relationship network includes nodes having a one-to-one correspondence with individual candidate categories of the plurality of candidate categories, at least two of the nodes that correspond to candidate categories having a direct superior-inferior relationship are connected by a connection edge, each node corresponds to a respective node expression vector having a corresponding category feature vector as its initial value, the graph convolutional network is configured to perform node expression vector aggregation of neighboring nodes for individual nodes to update corresponding node expression vectors, and the category expression vectors are node expression vectors corresponding to the nodes obtained through updating using the last layer of the graph convolutional network;
    fusing the category expression vectors together based on degrees of association between the category expression vectors and the first semantic vector by using the fusion layer, to obtain a first fused vector for the first text;
    obtaining a first prediction result for a classification category of the first text based on the first fused vector and the first semantic vector by using the fully connected layer; and
    adjusting model parameters in the encoding network, the graph convolutional network, the fusion layer, and the fully connected layer with an objective of consistency between the first prediction result and the text label, to train the service model.

2. The method according to claim 1, wherein the first text corresponds to candidate categories of multiple levels, and the text label is a candidate category of the lowest level.

3. The method according to claim 1, wherein the number of dimensions of the first semantic vector and the number of dimensions of the category expression vector are both s, and the fusing the category expression vectors together based on the degrees of association between the category expression vectors and the first semantic vector by using the fusion layer, to obtain the first fused vector for the first text includes:
    comparing the first semantic vector with the category expression vectors to determine first degrees of similarity between the category expression vectors and the first semantic vector; and
    performing weighted summation on the category expression vectors by using the first degrees of similarity, to obtain the first fused vector, weights of the category expression vectors being positively correlated with the corresponding first degrees of similarity.

4. The method according to claim 1, wherein the number of the candidate categories is n, the number of dimensions of the first semantic vector and the number of dimensions of the category expression vector are both s, and the fusing the category expression vectors together based on the degrees of association between the category expression vectors and the first semantic vector by using the fusion layer, to obtain the first fused vector for the first text includes:
   obtaining (a) an s-dimensional row vector corresponding to the first semantic vector and (b) an s-row and n-column category vector matrix formed by sequentially arranging the n category expression vectors;
   determining an n-dimensional intermediate vector based on a product of the s-dimensional row vector and the s-row and n-column category vector matrix; and
   performing weighted averaging on the category expression vectors by using respective elements in the n-dimensional intermediate vector as weighting weights of the corresponding candidate categories, to obtain the first fused vector.

5. The method according to claim 1, wherein the obtaining the first prediction result for the classification category of the first text based on the first fused vector and the first semantic vector by using the fully connected layer includes:
   splicing the first fused vector with the first semantic vector to obtain a first spliced vector; and
   processing the first spliced vector by using the fully connected layer, to obtain the first prediction result.

6. The method according to claim 1, wherein the adjusting the model parameters in the encoding network, the graph convolutional network, the fusion layer, and the fully connected layer with the objective of consistency between the first prediction result and the text label, to train the service model includes:
   determining a loss of the first prediction result relative to the text label by using a cross entropy method; and
   adjusting the model parameters in the encoding network, the graph convolutional network, the fusion layer, and the fully connected layer in a reduction direction of the loss.

7. The method according to claim 1, further comprising: when initial values of the category feature vectors are random values,
   adjusting the category feature vectors in the category hierarchical relationship network with an objective of consistency between the first prediction result and the text label.

8. A method for determining a text classification category, implemented by using a service model including an encoding network, a fusion layer, and a fully connected layer, the method comprising:
   obtaining a second text for classification category determination;
   processing the second text by using the encoding network, to obtain a second semantic vector corresponding to the second text;
   obtaining category expression vectors respectively corresponding to a plurality of candidate categories and obtained by processing a category hierarchical relationship network by using a graph convolutional network, wherein the category hierarchical relationship network includes nodes having a one-to-one correspondence with individual candidate categories of the plurality of candidate categories, at least two of the nodes that correspond to candidate categories having a direct superior-inferior relationship are connected by a connection edge, each node corresponds to a respective node expression vector having a corresponding category feature vector as its initial value, the graph convolutional network is configured to perform node expression vector aggregation of neighboring nodes for individual nodes to update corresponding node expression vectors, and the category expression vectors are node expression vectors corresponding to the nodes obtained through updating using the last layer of the graph convolutional network;
   fusing the category expression vectors together based on degrees of association between the category expression vectors and the second semantic vector by using the fusion layer, to obtain a second fused vector for the second text;
   obtaining a second prediction result for the second text based on the second fused vector and the second semantic vector by using the fully connected layer; and
   determining a classification category of the second text based on the second prediction result.

9. The method according to claim 8, wherein the number of dimensions of the second semantic vector and the number of dimensions of the category expression vector are both s, and the fusing the category expression vectors together based on the degrees of association between the category expression vectors and the second semantic vector by using the fusion layer, to obtain the second fused vector for the second text includes:
   comparing the second semantic vector with the category expression vectors to determine second degrees of similarity between the category expression vectors and the second semantic vector; and
   performing weighted summation on the category expression vectors by using the second degrees of similarity, to obtain the second fused vector, weights of the category expression vectors being positively correlated with the corresponding second degrees of similarity.

10. The method according to claim 8, wherein the number of the candidate categories is n, the number of dimensions of the second semantic vector and the number of dimensions of the category expression vector are both s, and the fusing the category expression vectors together based on the degrees of association between the category expression vectors and the second semantic vector by using the fusion layer, to obtain the second fused vector for the second text includes:
   obtaining (a) an s-dimensional row vector corresponding to the second semantic vector and (b) an s-row and n-column category vector matrix formed by sequentially arranging the n category expression vectors;
   determining an n-dimensional intermediate vector based on a product of the s-dimensional row vector corresponding to the second semantic vector and the s-row and n-column category vector matrix; and
   performing weighted averaging on the category expression vectors by using respective elements in the n-dimensional intermediate vector as weighting weights of the corresponding candidate categories, to obtain the second fused vector.

11. The method according to claim 8, wherein the obtaining the second prediction result for the classification category of the second text based on the second fused vector and the second semantic vector by using the fully connected layer includes:
   splicing the second fused vector with the second semantic vector to obtain a second spliced vector; and
   processing the second spliced vector by using the fully connected layer, to obtain the second prediction result.

12. A non-transitory computer readable medium storing contents that, when executed by one or more processors, cause the one or more processors to perform actions for training a service model, wherein the service model includes an encoding network, a fusion layer, and a fully connected layer and the actions comprise:
  obtaining a first text from a training sample set, the first text corresponding to a text label, and the text label being determined from a plurality of candidate categories;
  processing the first text by using the encoding network, to obtain a first semantic vector;
  processing a category hierarchical relationship network by using a graph convolutional network, to obtain category expression vectors respectively corresponding to a plurality of candidate categories, wherein the category hierarchical relationship network includes nodes having a one-to-one correspondence with individual candidate categories of the plurality of candidate categories, at least two of the nodes that correspond to candidate categories having a direct superior-inferior relationship are connected by a connection edge, each node corresponds to a respective node expression vector having a corresponding category feature vector as its initial value, the graph convolutional network is configured to perform node expression vector aggregation of neighboring nodes for individual nodes to update corresponding node expression vectors, and the category expression vectors are node expression vectors corresponding to the nodes obtained through updating using the last layer of the graph convolutional network;
  fusing the category expression vectors together based on degrees of association between the category expression vectors and the first semantic vector by using the fusion layer, to obtain a first fused vector for the first text;
  obtaining a first prediction result for a classification category of the first text based on the first fused vector and the first semantic vector by using the fully connected layer; and
  adjusting model parameters in the encoding network, the graph convolutional network, the fusion layer, and the fully connected layer with an objective of consistency between the first prediction result and the text label, to train the service model.

13. The computer readable medium according to claim 12, wherein the first text corresponds to candidate categories of multiple levels, and the text label is a candidate category of the lowest level.

14. The computer readable medium according to claim 12, wherein the number of dimensions of the first semantic vector and the number of dimensions of the category expression vector are both s, and the fusing the category expression vectors together based on the degrees of association between the category expression vectors and the first semantic vector by using the fusion layer, to obtain the first fused vector for the first text includes:
  comparing the first semantic vector with the category expression vectors to determine first degrees of similarity between the category expression vectors and the first semantic vector; and
  performing weighted summation on the category expression vectors by using the first degrees of similarity, to obtain the first fused vector, weights of the category expression vectors being positively correlated with the corresponding first degrees of similarity.

15. The computer readable medium according to claim 12, wherein the number of the candidate categories is n, the number of dimensions of the first semantic vector and the number of dimensions of the category expression vector are both s, and the fusing the category expression vectors together based on the degrees of association between the category expression vectors and the first semantic vector by using the fusion layer, to obtain the first fused vector for the first text includes:
  obtaining (a) an s-dimensional row vector corresponding to the first semantic vector and (b) an s-row and n-column category vector matrix formed by sequentially arranging the n category expression vectors;
  determining an n-dimensional intermediate vector based on a product of the s-dimensional row vector and the s-row and n-column category vector matrix; and
  performing weighted averaging on the category expression vectors by using respective elements in the n-dimensional intermediate vector as weighting weights of the corresponding candidate categories, to obtain the first fused vector.

16. The computer readable medium according to claim 12, wherein the obtaining the first prediction result for the classification category of the first text based on the first fused vector and the first semantic vector by using the fully connected layer includes:
  splicing the first fused vector with the first semantic vector to obtain a first spliced vector; and
  processing the first spliced vector by using the fully connected layer, to obtain the first prediction result.

17. The computer readable medium according to claim 12, wherein the adjusting the model parameters in the encoding network, the graph convolutional network, the fusion layer, and the fully connected layer with the objective of consistency between the first prediction result and the text label, to train the service model includes:
  determining a loss of the first prediction result relative to the text label by using a cross entropy method; and
  adjusting the model parameters in the encoding network, the graph convolutional network, the fusion layer, and the fully connected layer in a reduction direction of the loss.

18. The computer readable medium according to claim 12, further comprising: when initial values of the category feature vectors are random values,
  adjusting the category feature vectors in the category hierarchical relationship network with an objective of consistency between the first prediction result and the text label.

19. A non-transitory computer readable medium storing contents that, when executed by one or more processors, cause the one or more processors to perform actions for determining a text classification category by using a service model including an encoding network, a fusion layer, and a fully connected layer, the actions comprising:
  obtaining a second text for classification category determination;
  processing the second text by using the encoding network, to obtain a second semantic vector corresponding to the second text;
  obtaining category expression vectors respectively corresponding to a plurality of candidate categories and obtained by processing a category hierarchical relationship network by using a graph convolutional network, wherein the category hierarchical relationship network includes nodes having a one-to-one correspondence with individual candidate categories of the plurality of candidate categories, at least two of the nodes that correspond to candidate categories having a direct superior-inferior relationship are connected by a connection edge, each node corresponds to a respective node expression vector having a corresponding category feature vector as its initial value, the graph convolutional network is configured to perform node expression vector aggregation of neighboring nodes for individual nodes to update corresponding node expression vectors, and the category expression vectors are node expression vectors corresponding to the nodes obtained through updating using the last layer of the graph convolutional network;

fusing the category expression vectors together based on degrees of association between the category expression vectors and the second semantic vector by using the fusion layer, to obtain a second fused vector for the second text;

obtaining a second prediction result for the second text based on the second fused vector and the second semantic vector by using the fully connected layer; and determining a classification category of the second text based on the second prediction result.

20. The computer readable medium according to claim 19, wherein the number of dimensions of the second semantic vector and the number of dimensions of the category expression vector are both s, and the fusing the category expression vectors together based on the degrees of association between the category expression vectors and the second semantic vector by using the fusion layer, to obtain the second fused vector for the second text includes:

comparing the second semantic vector with the category expression vectors to determine second degrees of similarity between the category expression vectors and the second semantic vector; and performing weighted summation on the category expression vectors by using the second degrees of similarity, to obtain the second fused vector, weights of the category expression vectors being positively correlated with the corresponding second degrees of similarity.

21. The computer readable medium according to claim 19, wherein the number of the candidate categories is n, the number of dimensions of the second semantic vector and the number of dimensions of the category expression vector are both s, and the fusing the category expression vectors together based on the degrees of association between the category expression vectors and the second semantic vector by using the fusion layer, to obtain the second fused vector for the second text includes:

obtaining (a) an s-dimensional row vector corresponding to the second semantic vector and (b) an s-row and n-column category vector matrix formed by sequentially arranging the n category expression vectors;

determining an n-dimensional intermediate vector based on a product of the s-dimensional row vector corresponding to the second semantic vector and the s-row and n-column category vector matrix; and performing weighted averaging on the category expression vectors by using respective elements in the n-dimensional intermediate vector as weighting weights of the corresponding candidate categories, to obtain the second fused vector.

22. The computer readable medium according to claim 19, wherein the obtaining the second prediction result for the classification category of the second text based on the second fused vector and the second semantic vector by using the fully connected layer includes:

splicing the second fused vector with the second semantic vector to obtain a second spliced vector; and processing the second spliced vector by using the fully connected layer, to obtain the second prediction result.

\* \* \* \* \*